(12) United States Patent
Kabeya et al.

(10) Patent No.: US 12,202,430 B2
(45) Date of Patent: Jan. 21, 2025

(54) TEXTILE FOR HOLLOW WEAVE AIRBAG

(71) Applicants: Asahi Kasei Kabushiki Kaisha, Tokyo (JP); Autoliv Development AB, Vargarda (SE)

(72) Inventors: Takumi Kabeya, Tokyo (JP); Yuta Arai, Yokohama (JP)

(73) Assignees: Asahi Kasei Kabushiki Kaisha, Tokyo (JP); Autoliv Development AB, Vargarda (SE)

( * ) Notice: Subject to any disclaimer, the term of this patent is extended or adjusted under 35 U.S.C. 154(b) by 145 days.

(21) Appl. No.: 18/008,993

(22) PCT Filed: Jul. 1, 2021

(86) PCT No.: PCT/JP2021/025018
§ 371 (c)(1),
(2) Date: Dec. 8, 2022

(87) PCT Pub. No.: WO2022/004858
PCT Pub. Date: Jan. 6, 2022

(65) Prior Publication Data
US 2023/0278519 A1  Sep. 7, 2023

(30) Foreign Application Priority Data

Jul. 1, 2020 (JP) ................. 2020-114016

(51) Int. Cl.
*D03D 9/00* (2006.01)
*B60R 21/232* (2011.01)
*B60R 21/235* (2006.01)
*D03D 1/02* (2006.01)
*D03D 11/00* (2006.01)
(Continued)

(52) U.S. Cl.
CPC .......... *B60R 21/235* (2013.01); *B60R 21/232* (2013.01)

(58) Field of Classification Search
CPC ........ D03D 9/00; D03D 11/00; D03D 13/008; D03D 1/02; D10B 2505/124; B60R 21/232; B60R 21/235
See application file for complete search history.

(56) References Cited

U.S. PATENT DOCUMENTS

2006/0201242 A1  9/2006 Nakayama
2010/0048079 A1  2/2010 Fujiyama et al.
(Continued)

FOREIGN PATENT DOCUMENTS

CN  103726168 A  4/2014
JP  2001-277970 A  10/2001
(Continued)

OTHER PUBLICATIONS

International Search Report issued in corresponding International Patent Application No. PCT/JP2021/025018 dated Sep. 7, 2021.
(Continued)

*Primary Examiner* — Joanna Pleszczynska
(74) *Attorney, Agent, or Firm* — Morgan, Lewis & Bockius LLP (57) ABSTRACT

Provided is a textile for a hollow weave airbag, said textile being suitable for an airbag that has superior packability while satisfying internal pressure retention and abrasion resistance characteristics required from the airbag, and also has superior laceration resistance at the time of airbag deployment.

15 Claims, 5 Drawing Sheets

(51) Int. Cl.
*D03D 13/00* (2006.01)
*D03D 49/04* (2006.01)

(56) References Cited

U.S. PATENT DOCUMENTS

| | | |
|---|---|---|
| 2013/0273276 A1 | 10/2013 | Han et al. |
| 2015/0329998 A1 | 11/2015 | Ise |
| 2016/0207492 A1 | 7/2016 | Akechi et al. |
| 2018/0208147 A1 | 7/2018 | Yokoi |
| 2020/0353889 A1 | 11/2020 | Kamimura et al. |

FOREIGN PATENT DOCUMENTS

| | | |
|---|---|---|
| JP | 2004-084089 A | 3/2004 |
| JP | 2005-179806 A | 7/2005 |
| JP | 2006-037287 A | 2/2006 |
| JP | 2006-062590 A | 3/2006 |
| JP | 2006-284570 A | 10/2006 |
| JP | 2007-261380 A | 10/2007 |
| JP | 2008-25089 A | 2/2008 |
| JP | 2008-054840 A | 3/2008 |
| JP | 2011-126429 A | 6/2011 |
| JP | 2013-142207 A | 7/2013 |
| JP | 2015-17356 A | 1/2015 |
| JP | 2018-076622 A | 5/2018 |
| JP | 2018-114958 A | 7/2018 |
| JP | 2019-173262 A | 10/2019 |
| WO | 2017/010458 A1 | 1/2017 |
| WO | 2019/039396 A1 | 2/2019 |

OTHER PUBLICATIONS

International Preliminary Report on Patentability and Written Opinion issued in corresponding International Patent Application No. PCT/JP2021/025018 dated Jan. 12, 2023.

| | | Units | Example 1 | Example 2 | Example 3 | Example 4 |
|---|---|---|---|---|---|---|
| | Method of entering coarse pattern (Warp↑) | | ▦ | ▦ | ▦ | ▦ |
| Raw yarn properties | Raw yarn strength | cN/dtex | 8.5 | 8.5 | 8.5 | 8.5 |
| | Hot water dimensional change rate | % | 8.5 | 8.5 | 4.0 | 8.5 |
| Production conditions | Weaving tension | cN/dtex | 0.16 | 0.16 | 0.35 | 0.35 |
| | Wind-up tension during weaving | cN/dtex | 0.16 | 0.16 | 0.35 | 0.35 |
| | Warp tension during coating | cN/dtex | 0.20 | 0.20 | 0.40 | 0.40 |
| | Warp tension during heat setting | cN/dtex | 0.20 | 0.40 | 0.40 | 0.40 |
| Base fabric structure | Fineness | dtex | 235 | 235 | 235 | 235 |
| | Resin amount | g/m² | 80 | 80 | 80 | 80 |
| | Bag weight (basis weight) | g/m² | 242 | 243 | 240 | 245 |
| | Density (warp) | /inch | 65 | 65 | 64 | 64 |
| | Density (weft) | /inch | 72 | 72 | 71 | 72 |
| | CF | - | 2100 | 2100 | 2062 | 2085 |
| | Effective CF | - | 1485 | 1485 | 1458 | 1474 |
| | Warp and weft ratio for effective CF | - | 0.90 | 0.90 | 0.89 | 0.89 |
| | Ratio of effective CF and CF | - | 0.71 | 0.71 | 0.71 | 0.71 |
| | Crimp percentage (warp) | % | 5.9 | 5.2 | 1.3 | 0.7 |
| | Crimp percentage (weft) | % | 7.3 | 7.5 | 8.5 | 10.5 |
| | Crimp percentage difference | % | 1.4 | 2.3 | 7.2 | 9.8 |
| | Oil adhesion rate | % | 0.3 | 0.3 | 0.3 | 0.01 |
| Base fabric mechanical properties | Dynamic tearing length (warp) | mm | 24.7 | 24.6 | 27.1 | 33.0 |
| | Dynamic tearing length (weft) | mm | 27.8 | 27.5 | 33.2 | 39.5 |
| | Dynamic tearing characteristic (warp) | J/m·dtex | 1.19 | 1.19 | 1.08 | 0.89 |
| | Dynamic tearing characteristic (weft) | J/m·dtex | 1.06 | 1.07 | 0.88 | 0.74 |
| | Dynamic tearing characteristic (total) | J/m·dtex | 2.24 | 2.26 | 1.97 | 1.63 |
| | KES bending resistance (warp) | gf·cm²/cm | 0.4 | 0.4 | 1.1 | 1.1 |
| | KES bending resistance (weft) | gf·cm²/cm | 0.4 | 0.4 | 0.2 | 0.2 |
| | KES bending resistance (warp/weft) | - | 1.2 | 1.2 | 5.3 | 5.8 |
| Cushion properties | | times | 150 | 150 | 400 | 600 |
| | Roll diameter | - | G | G | G | G |
| | Laceration resistance | - | G | G | F | F |
| | | | P | P | F | F |

Abrasion resistance after moist heat aging
Internal pressure retention after moist heat aging

FIG. 4

| | | | Example 5 | Example 6 | Example 7 | Example 8 |
|---|---|---|---|---|---|---|
| | Method of entering coarse pattern (Warp↑) | Units |  |  |  |  |
| Raw yarn properties | Raw yarn strength | cN/dtex | 8.5 | 8.5 | 8.5 | 8.5 |
| | Hot water dimensional change rate | % | 8.5 | 8.5 | 8.5 | 8.5 |
| Production conditions | Weaving tension | cN/dtex | 0.35 | 0.35 | 0.35 | 0.35 |
| | Wind-up tension during weaving | cN/dtex | 0.35 | 0.35 | 0.35 | 0.35 |
| | Warp tension during coating | cN/dtex | 0.40 | 0.40 | 0.40 | 0.40 |
| | Warp tension during heat setting | cN/dtex | 0.40 | 0.40 | 0.40 | 0.40 |
| Base fabric structure | Fineness | dtex | 235 | 235 | 470 | 235 |
| | Resin amount | g/m² | 80 | 80 | 80 | 80 |
| | Bag weight (basis weight) | g/m² | 245 | 246 | 382 | 243 |
| | Density (warp) | /inch | 64 | 64 | 47 | 66 |
| | Density (weft) | /inch | 72 | 72 | 55 | 73 |
| | CF | - | 2085 | 2085 | 2211 | 2131 |
| | Effective CF | - | 1474 | 1474 | 1564 | 1834 |
| | Warp and weft ratio for effective CF | - | 0.89 | 0.89 | 0.85 | 0.64 |
| | Ratio of effective CF and CF | - | 0.71 | 0.71 | 0.71 | 0.86 |
| | Crimp percentage (warp) | % | 0.7 | 0.7 | 0.9 | 2.5 |
| | Crimp percentage (weft) | % | 10.5 | 10.7 | 10.5 | 10.3 |
| | Crimp percentage difference | % | 9.8 | 10.0 | 9.6 | 7.8 |
| | Oil adhesion rate | % | 0.1 | 0.3 | 0.3 | 0.3 |
| Base fabric mechanical properties | Dynamic tearing length (warp) | mm | 28.2 | 23.6 | 12.2 | 23.0 |
| | Dynamic tearing length (weft) | mm | 34.5 | 28.0 | 14.2 | 37.8 |
| | Dynamic tearing characteristic (warp) | J/m·dtex | 1.04 | 1.24 | 1.20 | 1.28 |
| | Dynamic tearing characteristic (weft) | J/m·dtex | 0.85 | 1.05 | 1.03 | 0.78 |
| | Dynamic tearing characteristic (total) | J/m·dtex | 1.89 | 2.29 | 2.23 | 2.05 |
| | KES bending resistance (warp) | gf·cm²/cm | 1.1 | 1.1 | 1.4 | 0.7 |
| | KES bending resistance (weft) | gf·cm²/cm | 0.2 | 0.2 | 0.5 | 0.4 |
| | KES bending resistance (warp/weft) | - | 5.7 | 5.7 | 2.8 | 1.8 |
| Cushion properties | Abrasion resistance after moist heat aging | times | 550 | 550 | 600 | 800 |
| | Roll diameter | - | G | G | F | F |
| | Laceration resistance | - | F | G | G | F |
| | Internal pressure retention after moist heat aging | - | F | F | F | G |

FIG. 5

| | | | Example 9 | Example 10 | Example 11 | Example 12 |
|---|---|---|---|---|---|---|
| | Method of entering coarse pattern (Warp↑) | Units |  |  |  |  |
| Raw yarn properties | Raw yarn strength | cN/dtex | 8.5 | 8.5 | 8.5 | 8.5 |
| | Hot water dimensional change rate | % | 8.5 | 8.5 | 8.5 | 8.5 |
| Production conditions | Weaving tension | cN/dtex | 0.35 | 0.35 | 0.35 | 0.35 |
| | Wind-up tension during weaving | cN/dtex | 0.35 | 0.35 | 0.35 | 0.35 |
| | Warp tension during coating | cN/dtex | 0.40 | 0.40 | 0.40 | 0.40 |
| | Warp tension during heat setting | cN/dtex | 0.40 | 0.40 | 0.40 | 0.40 |
| Base fabric structure | Fineness | dtex | 235 | 235 | 235 | 235 |
| | Resin amount | g/m$^2$ | 80 | 80 | 80 | 80 |
| | Bag weight (basis weight) | g/m$^2$ | 244 | 247 | 245 | 345 |
| | Density (warp) | /inch | 66 | 65 | 65 | 64 |
| | Density (weft) | /inch | 75 | 72 | 73 | 74 |
| | CF | - | 2161 | 2100 | 2115 | 2115 |
| | Effective CF | - | 1948 | 1575 | 1654 | 1783 |
| | Warp and weft ratio for effective CF | - | 0.88 | 0.90 | 1.09 | 1.22 |
| | Ratio of effective CF and CF | - | 0.90 | 0.75 | 0.78 | 0.84 |
| | Crimp percentage (warp) | % | 4.2 | 1.5 | 0.8 | 0.8 |
| | Crimp percentage (weft) | % | 9.0 | 9.6 | 11.2 | 11.3 |
| | Crimp percentage difference | % | 4.8 | 8.1 | 10.4 | 10.5 |
| | Oil adhesion rate | % | 0.3 | 0.3 | 0.3 | 0.3 |
| Base fabric mechanical properties | Dynamic tearing length (warp) | mm | 29.4 | 24.8 | 26.8 | 27.5 |
| | Dynamic tearing length (weft) | mm | 38.9 | 28.7 | 28.7 | 28.4 |
| | Dynamic tearing characteristic (warp) | J/m·dtex | 1.00 | 1.18 | 1.10 | 1.07 |
| | Dynamic tearing characteristic (weft) | J/m·dtex | 0.75 | 1.02 | 1.02 | 1.03 |
| | Dynamic tearing characteristic (total) | J/m·dtex | 1.75 | 2.21 | 2.12 | 2.10 |
| | KES bending resistance (warp) | gf·cm$^2$/cm | 0.6 | 0.8 | 0.8 | 1.0 |
| | KES bending resistance (weft) | gf·cm$^2$/cm | 0.4 | 0.2 | 0.2 | 0.2 |
| | KES bending resistance (warp/weft) | - | 1.4 | 3.8 | 4.0 | 4.8 |
| Cushion properties | Abrasion resistance after moist heat aging | times | 650 | 600 | 850 | 800 |
| | Roll diameter | - | F | G | G | G |
| | Laceration resistance | - | F | G | G | G |
| | Internal pressure retention after moist heat aging | - | F | F | G | G |

FIG. 6

| | | Units | Comp. Example 1 | Comp. Example 2 | Comp. Example 3 |
|---|---|---|---|---|---|
| Method of entering coarse pattern (Warp↑) | | | | | |
| Raw yarn properties | Raw yarn strength | cN/dtex | 8.5 | 8.5 | 8.5 |
| | Hot water dimensional change rate | % | 8.5 | 8.5 | 8.5 |
| Production conditions | Weaving tension | cN/dtex | 0.16 | 0.35 | 0.35 |
| | Wind-up tension during weaving | cN/dtex | 0.16 | 0.35 | 0.35 |
| | Warp tension during coating | cN/dtex | 0.20 | 0.40 | 0.40 |
| | Warp tension during heat setting | cN/dtex | 0.20 | 0.40 | 0.40 |
| Base fabric structure | Fineness | dtex | 235 | 235 | 470 |
| | Resin amount | g/m² | 80 | 80 | 80 |
| | Bag weight (basis weight) | g/m² | 237 | 237 | 377 |
| | Density (warp) | /inch | 73 | 73 | 49 |
| | Density (weft) | /inch | 77 | 77 | 57 |
| | CF | - | 2303 | 2304 | 2298 |
| | Effective CF | - | 2303 | 2304 | 2298 |
| | Warp and weft ratio for effective CF | - | 0.95 | 0.95 | 0.86 |
| | Ratio of effective CF and CF | - | 1.00 | 1.00 | 1.00 |
| | Crimp percentage (warp) | % | 7.4 | 4.8 | 4.9 |
| | Crimp percentage (weft) | % | 7.2 | 8.2 | 8.2 |
| | Crimp percentage difference | % | 0.2 | 3.4 | 3.3 |
| | Oil adhesion rate | % | 0.3 | 0.3 | 0.3 |
| Base fabric mechanical properties | Dynamic tearing length (warp) | mm | 38.9 | 37.6 | 23.9 |
| | Dynamic tearing length (weft) | mm | 42.4 | 43.4 | 28.6 |
| | Dynamic tearing characteristic (warp) | J/m·dtex | 0.75 | 0.78 | 0.61 |
| | Dynamic tearing characteristic (weft) | J/m·dtex | 0.69 | 0.68 | 0.51 |
| | Dynamic tearing characteristic (total) | J/m·dtex | 1.45 | 1.46 | 1.13 |
| | KES bending resistance (warp) | gf·cm²/cm | 0.4 | 0.4 | 0.6 |
| | KES bending resistance (weft) | gf·cm²/cm | 0.4 | 0.4 | 0.8 |
| | KES bending resistance (warp/weft) | - | 1.0 | 1.2 | 0.7 |
| Cushion properties | | times | 1000 | 1000 | 1000 |
| | Roll diameter | - | F | F | P |
| | Laceration resistance | - | P | P | P |
| | | | G | G | G |

Abrasion resistance after moist heat aging
Internal pressure retention after moist heat aging

TEXTILE FOR HOLLOW WEAVE AIRBAG

FIELD

The present invention relates to a textile to be used in an airbag which serves as an item of safety equipment for a vehicle such as an automobile.

BACKGROUND

The use of vehicle airbags is increasing in recent years in order to improve safety for passengers of vehicles such as automobiles. A variety of airbags have been developed for different types of collisions and rider locations, including driver airbags and passenger airbags that are fitted at the front ends of driving seats or passenger seats and protect riders mainly from impact caused by head-on collision of the vehicle, as well as side airbags that protect riders mainly from impact caused by side collision of the vehicle and knee airbags that protect rider legs.

A curtain airbag that protects a rider mainly from impact caused by side collisions is stored in a region along the roof rail of the automobile from the front pillar side to the pillar side, for example, and is designed to swell and expand in the form of a curtain along the side glass in the event of a detected collision. When a curtain airbag is deployed it must be instantaneously inserted between the head of the rider and the glass in order to protect the head, and must therefore have a rapid deployment speed. In addition, it is necessary that the internal pressure of the cushion does not considerably decrease, in order to minimize not only the initial impact (first impact) of the collision but also any impact by rolling over of the car body, and in order to prevent falling out of the vehicle, while it is also necessary that the cushion shape and deployment behavior provide a range of protection that covers the side glass.

During storage, the curtain airbag is set in the form of a roll or a folded cornice, for example, and then anchored with a base fabric or tape. It is extremely important for the curtain airbag to have excellent packability (compactness) in order to ensure wide interior space while satisfying the aforementioned requirements.

It is a natural expectation that the internal pressure retention of the curtain airbag should function even after being exposed to different environments. The design must therefore be such that function is not lost even in harsh environmental test conditions such as heat aging, moist heat aging, thermal cyclic aging.

During deployment of a curtain airbag, the side glass and the cushion surfaces of obstacles inside and outside of the car body may also interfere, producing lacerations in the base fabric surface. When lacerations are formed, the internal pressure retention of the cushion is lowered and the reaction force property of the airbag is notably reduced, potentially resulting in impairment of the shock absorption performance required for the airbag.

PTL 1 describes a method of protecting an airbag from lacerations and of absorbing impact for riders without injury or damage, by a design such that a covering material is formed on a cushion surface and the penetration strength with a push blade is 5 N or greater as measured using a constant speed elongation bursting tester conforming to JIS L-1096 (method 8.16.2 B).

In this method, however, the covering material is sewn or coated onto the main base fabric of the cushion to increase the penetration strength of the cushion surface, and this increases the thickness or hardness of the cushion and potentially compromises the packability of the airbag.

PTL 2 describes forming the texture of the expanding part as a lattice texture or a woven texture known as "ripstop", in order to maximally reduce the extent of damage to the curtain airbag by glass shards. However, the effects on the internal pressure retention of the cushion during high-speed deployment of the airbag using the woven texture described in this publication have not been studied, and in fact experimentation by the present inventors has demonstrated that, despite the effect of reducing damage to a certain degree, there is a potential for impaired shock absorption performance and failure to retain the cushion internal pressure, depending on the deployment speed and deploy direction of the airbag.

Another problem is that the looser texture increases the freedom of the constituent fibers, lowering the abrasion resistance under harsh environmental test conditions including heat aging, moist heat aging and thermal cyclic aging.

PTL 3 shows that airtightness can be retained even with a lower amount of coating agent, by using a hollow weave airbag having a plain weave texture as the main texture for the deployed section, with partial introduction of a coarser texture than the plain weave texture and with increased yarn density in the coarse texture. However, it is not indicated that this described woven texture provides any improvement in the effects on internal pressure retention of the cushion during high-speed deployment of the airbag or in glass shard damage, nor are these aspects examined. Another problem with the hollow weave airbag described in PTL 3 is that coating thickness spots are increased with the partially coarser and denser texture, thus lowering the abrasion resistance under harsh environmental test conditions including heat aging, moist heat aging and thermal cyclic aging.

CITATION LIST

Patent Literature

[PTL 1] Japanese Unexamined Patent Publication No. 2006-62590
[PTL 2] Japanese Unexamined Patent Publication No. 2011-126429
[PTL 3] Japanese Unexamined Patent Publication No. 2018-114958

SUMMARY

Technical Problem

In light of the aforementioned problems of the prior art, the problem to be solved by the invention is to provide an airbag textile that satisfies the internal pressure retention and wear resistance required for a curtain airbag, while having excellent packability and excellent laceration resistance during airbag deployment.

Solution to Problem

The present inventors have conducted diligent experimentation in order to solve the aforementioned problems, and as a result have completed this invention upon finding, unexpectedly, that if the textile has specified properties in a dynamic tearing test according to JIS T 8050, it is possible to obtain an airbag textile that satisfies the internal pressure retention and wear resistance required for a curtain airbag, while having excellent packability and excellent laceration resistance during airbag deployment.

Specifically, the present invention is as follows.

[1] A textile for a hollow weave airbag having a double hollow weave pattern, wherein the value of the dynamic tearing characteristic P in at least a partial region of the double hollow weave pattern is 1.5 or greater, as represented by the following formulas:

$$Px = \{E/(Tx \times Fx)\} \times 1000$$

$$Py = \{E/(Ty \times Fy)\} \times 1000$$

$$P = Px + Py$$

{where E is the kinetic energy (J) of the block and blade in a dynamic tearing test according to JIS T 8050 (performance level 3), Tx is the average value of the tearing length (mm) in the warp direction in a dynamic tearing test according to JIS T 8050 (performance level 3), Fx is the fineness (dtex) of the warp yarn forming the double hollow weave pattern, Ty is the average value of the tearing length (mm) in the weft direction in a dynamic tearing test according to JIS T 8050 (performance level 3), and Fy is fineness (dtex) of the weft yarn forming the double hollow weave pattern}.

[2] The textile for a hollow weave airbag according to [1] above, wherein the difference between the warp yarn crimp percentage and the weft yarn crimp percentage in the double hollow weave pattern is 4% or greater.

[3] The textile for a hollow weave airbag according to [1] or [2] above, wherein the ratio CF'/CF of the cover factor CF and the effective cover factor CF' for at least a partial region of the double hollow weave pattern, represented by the following formulas:

$$CF = Dx \times \sqrt{Fx} + Dy \times \sqrt{Fy}$$

$$CF' = Cx \times \sqrt{\{Fx \times (Dx/Cx)\}} + Cy \times \sqrt{\{Fy \times (Dy/Cy)\}}$$

{where Dx is the number of warp threads per 2.54 cm (warp density), Fx is the fineness (dtex) of the warp yarn forming the double hollow weave pattern, Dy is the number of weft threads per 2.54 cm (weft density), Fy is the fineness (dtex) of the weft yarn forming the double hollow weave pattern, Cx is the number of warp fiber intersections per 2.54 cm and Cy is the number of weft fiber intersections per 2.54 cm} is 0.95 or lower.

[4] The textile for a hollow weave airbag according to [3] above, wherein the value of the effective cover factor CF' for at least a partial region of the double hollow weave pattern is 2200 or lower.

[5] The textile for a hollow weave airbag according to any one of [1] to [4] above, wherein the dynamic tearing characteristic Px and Py for warp and weft in at least a partial region of the double hollow weave pattern is 0.7 or greater.

[6] The textile for a hollow weave airbag according to any one of [1] to [5] above, wherein the double hollow weave pattern is covered with a resin, the resin amount being 120 g/cm² or lower.

[7] The textile for a hollow weave airbag according to any one of [1] to [6] above, wherein an oil is adhered onto the constituent yarn of the double hollow weave pattern, the oil adhesion percentage being 0.01 wt % to 2.0 wt %.

[8] The textile for a hollow weave airbag according to any one of [1] to [7] above, wherein the fineness of the constituent yarn of the double hollow weave pattern is 500 dtex or lower.

[9] The textile for a hollow weave airbag according to any one of [1] to [8] above, wherein the basis weight of the double hollow weave pattern is 400 g/m² or lower.

[10] The textile for a hollow weave airbag according to any one of [1] to [9] above, wherein the flexural modulus warp/weft ratio in at least a partial region of the double hollow weave pattern is 2.0 or greater as determined with a KES bending tester.

[11] The textile for a hollow weave airbag according to any one of [1] to [10] above, wherein the flexural modulus in the warp and/or weft direction of at least a partial region of the double hollow weave pattern is 0.5 gf·cm²/cm or lower as determined with a KES bending tester.

[12] The textile for a hollow weave airbag according to any one of [3] to [11] above, wherein at least a partial region of the double hollow weave pattern has a warp/weft ratio for the effective cover factor CF', represented by the following formula:

$$[Cx \times \sqrt{\{Fx \times (Dx/Cx)\}}]/[Cy \times \sqrt{\{Fy \times (Dy/Cy)\}}]$$

is 0.7 or greater.

[13] A method for producing a textile for a hollow weave airbag according to any one of [1] to [12] above, wherein the warp yarn tension during weaving is 0.18 cN/dtex to 0.50 cN/dtex, the wind-up tension after weaving is 0.4 to 2.0 times the warp yarn tension, the tension in the warp direction during coating is 0.20 cN/dtex to 0.72 cN/dtex and the tension in the warp direction during heat setting is 0.20 cN/dtex to 0.72 cN/dtex.

[14] The method according to [13] above, wherein the hot water dimensional change rate of the raw yarn used for weaving is 5% to 10%.

[15] A curtain airbag that includes a textile for a hollow weave airbag according to any one of [1] to [12] above.

Advantageous Effects of Invention

By using a textile for a hollow weave airbag according to the invention it is possible to produce an airbag that satisfies the internal pressure retention and wear resistance required for a curtain airbag, while having excellent packability and excellent laceration resistance during airbag deployment.

DESCRIPTION OF EMBODIMENTS

An embodiment for carrying out the invention (hereunder referred to as "the embodiment") will now be explained in detail. The invention is not limited to the embodiment, however, and various modifications may be implemented within the scope of the gist thereof.

The textile for a hollow weave airbag of the embodiment is a textile for a hollow weave airbag with a double hollow weave pattern, and it has a high dynamic tearing characteristic due to a loose texture in at least a partial region of the double hollow weave pattern. Specifically, the value of the dynamic tearing characteristic P in at least a partial region of the double hollow weave pattern is 1.5 or greater, as represented by the following formulas:

$$Px = \{E/(Tx \times Fx)\} \times 1000$$

$$Py = \{E/(Ty \times Fy)\} \times 1000$$

$$P = Px + Py$$

{where E is the kinetic energy (J) of the block and blade in a dynamic tearing test according to JIS T 8050 (performance level 3), Tx is the average value of the tearing length (mm) in the warp direction in a dynamic tearing test according to JIS T 8050 (performance level 3), Fx is the fineness (dtex) of the warp yarn forming the double hollow weave pattern, Ty is the average value of the tearing length (mm) in the weft direction in a dynamic tearing test according to JIS T 8050 (performance level 3), and Fy is fineness (dtex) of the weft yarn forming the double hollow weave pattern}.

The materials of the warp yarn and weft yarn forming the textile for a hollow weave airbag of the embodiment are not particularly restricted, and they may be, for example, polyamide fibers obtained from nylon 66, nylon 6, nylon 46, nylon 610 or nylon 612 alone or their copolymers or blends, polyester fibers obtained from polyethylene terephthalate, polytrimethylene terephthalate, polybutylene terephthalate or polyethylene naphthalate alone or their copolymers or blends, total aromatic polyamide fibers which are typically paraphenylene terephthalamide, or copolymers of the same with aromatic ethers, total aromatic polyester fibers, vinylon fibers, polyolefin fibers such as high-strength polyethylene and polypropylene, vinyl chloride-based and vinylidene chloride-based fibers, fluorine-based fibers including polytetrafluoroethylene-based fibers, polysulfone fibers, polyphenylene sulfide (PPS)-based fibers, polyether ketone (PEEK)-based fibers, polyalkyl ketone fibers, polyimide fibers, polyetherimide fibers, cellulose-based fibers including high-strength rayon, acrylic fibers, carbon fibers, glass fibers, silicon carbide (SiC) fibers and alumina fibers, either alone or in combinations. Synthetic fibers are preferred among these from the viewpoint of strength and economy, with polyamide fibers and especially nylon 66 long fibers being especially preferred because of their low impact resistance for riders.

The fibers forming the airbag textile in the textile for a hollow weave airbag of the embodiment can be produced by a publicly known spin draw process.

The fiber yarns may also contain various additives to improve processing throughput during the raw yarn production steps or post-treatment steps. For example, one or more heat-resistant stabilizers, light stabilizers, age inhibitors, antioxidants, lubricants, lubricating agents, pigments, water repellents, oil repellents, masking agents such as titanium oxide, brightening agents, flame retardants, plasticizers, antistatic agents or thickeners may be used in combination. Treatment such as twisting, bulking, crimping or winding may also be carried out if necessary.

A publicly known spinning oil may also be added to improve the convergence and stretchability of the fibers during spinning. Such a spinning oil is preferably added at 0.1 wt % to 5 wt %.

The warp yarn and weft yarn forming the textile for a hollow weave airbag of the embodiment preferably has a total fineness of 100 dtex to 550 dtex, more preferably 150 dtex to 500 dtex, even more preferably 150 dtex to 370 dtex and most preferably 150 dtex to 300 dtex. A total fineness of 100 dtex or greater will be able to withstand the force during deployment and expansion. A total fineness of 550 dtex or lower, on the other hand, will result in a more flexible textile, improved packability and higher-speed deployment.

The single fiber fineness of the warp yarn and weft yarn forming the textile for a hollow weave airbag of the embodiment is preferably 0.5 dtex to 8 dtex and more preferably 1.5 dtex to 3.7 dtex. A single fiber fineness of 0.5 dtex or greater can inhibit generation of fluff in the warp yarn during weaving. A single fiber fineness of 8 dtex or lower, on the other hand, can result in a textile with greater flexibility.

The monofilament cross-sectional shapes of the warp yarn and weft yarn are not particularly restricted and may be circular, as well as atypical cross-sectional shapes such as triangular, hexagonal or flat, but circular cross-sections are preferred from the viewpoint of exhibiting maximum strength.

The weight (basis weight) of the double hollow weave portion of the textile for a hollow weave airbag of the embodiment is preferably 400 g/m² or lower, more preferably 350 g/m² or lower and even more preferably 300 g/m² or lower. The basis weight referred to here is the weight of one single-sided base fabric in the double hollow weave portion, and it includes any resin such as the coating. A basis weight of 400 g/m² or lower will result in a lighter airbag and improved packability. The lower limit for the basis weight is not particularly restricted but is preferably 100 g/m² or greater.

The cover factor (CF) of the textile for a hollow weave airbag of the embodiment is preferably 1900 to 2400. The CF is twice the value in the single junction zone of the hollow weave, but here the CF is that of one single-sided base fabric of the double hollow weave portion. The CF value is calculated by the following formula:

$$CF = Dx \times \sqrt{Fx} + Dy \times \sqrt{Fy}$$

{where Dx is the number of warp threads per 2.54 cm (warp density) of the double hollow weave pattern, Fx is the fineness (dtex) of the warp yarn forming the double hollow weave pattern, Dy is the number of weft threads per 2.54 cm (weft density) of the double hollow weave pattern, and Fy is the fineness (dtex) of the weft yarn forming the double hollow weave pattern}.

A CF of 1900 or greater can increase the internal pressure retention during deployment. The CF value is more preferably 2000 or greater and even more preferably 2100 or greater. A CF of 2400 or lower, on the other hand, can improve the packability. The CF value is more preferably 2300 or lower and even more preferably 2200 or lower.

An airbag textile with the double hollow weave pattern of the embodiment has in at least a partial region of the double hollow weave pattern a section wherein the value of the dynamic tearing characteristic P is 1.5 or greater, as explained below. The value of the dynamic tearing characteristic P is preferably 1.7 or greater, more preferably 1.9 or greater, even more preferably 2.0 or greater and most preferably 2.1 or greater. The upper limit for the P value is not particularly restricted, but is preferably 20 or lower in order to obtain a flexible airbag base fabric.

The value of the dynamic tearing characteristic P is calculated from the result of the "Test method for the determination of resistance to puncture and dynamic tearing of materials", of JIS T 8050. Specifically, it represented by the following formulas:

$$Px=\{E/(Tx \times Fx)\} \times 1000$$

$$Py=\{E/(Ty \times Fy)\} \times 1000$$

$$P=Px+Py$$

{where E is the kinetic energy (J) of the block and blade in a dynamic tearing test according to JIS T 8050 (performance level 3), Tx is the average value of the tearing length (mm) in the warp direction in a dynamic tearing test according to JIS T 8050 (performance level 3), Fx is the fineness (dtex) of the warp yarn forming the double hollow weave pattern, Ty is the average value of the tearing length (mm) in the weft direction in a dynamic tearing test according to JIS T 8050 (performance level 3), and Fy is fineness (dtex) of the weft yarn forming the double hollow weave pattern}.

Tx and Ty are the average value of the tearing length (mm) in the warp direction and the weft direction, respectively, in the dynamic tearing test according to JIS T 8050. However, a blade-holding block and blade with a mass of 1000 g are used, and adjustment is made so that the block and blade kinetic energy is 6.6 J to 7.0 J as calculated from the average speed when the block has been consecutively dropped 5 times. That is, the test conditions are set for evaluation of performance level 3 performance according to JIS T 8050. For measurement of the tearing length in the warp direction and weft direction, tests were conducted using a minimum of three test strips for each direction, and the average tearing length in each direction was calculated. The value of "E" is the kinetic energy (J) of the block and blade as calculated from the average speed, and it is a value in the range of 6.6 J to 7.0 J.

In the dynamic tearing test, the tearing length produced on the test strip is measured by falling of the laceration blade, but the tearing length also indicates the extent of damage of the test strip occurring upon absorption of the kinetic energy of the laceration blade. The value of the dynamic tearing characteristic P indicates the kinetic energy that can be absorbed by the test strip, per unit fineness and per unit tearing length.

The "damage mode" in the dynamic tearing test approximates laceration mode during deployment of a curtain airbag. A high dynamic tearing characteristic P means that laceration is inhibited in a deployment test with simulated glass shards. If the double hollow weave pattern is designed so as to have a high dynamic tearing characteristic P, then it will be possible to prevent reduction in internal pressure retention of the cushion by laceration even when the curtain airbag is interfered with by side glass or obstacles inside or outside the car body during deployment, and to maintain the level of shock absorption performance required for an airbag.

Figure 1:
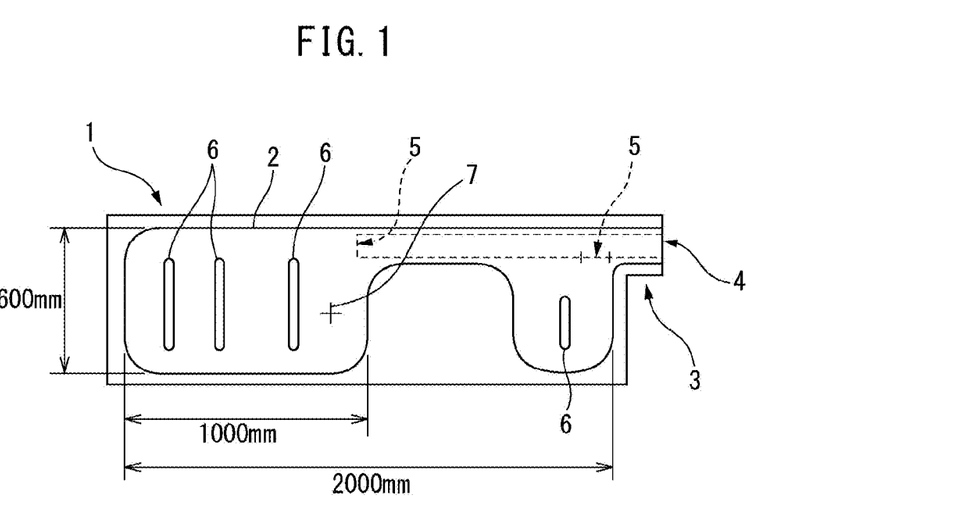
FIG. 1 is a plan view of a curtain airbag according to an Example of the invention.

FIG. 1 shows a plan view structure of a curtain-type textile for a hollow weave airbag, as an example of a textile for a hollow weave airbag of the embodiment. In FIG. 1, the portion of the curtain airbag 1 inside the bag boundary 2 has a section with a dynamic tearing characteristic P value of 1.5 or greater. When the textile for a hollow weave airbag of the embodiment is to be actually used as a curtain airbag, it may be designed so as to have a location with a dynamic tearing characteristic P value of 1.5 or greater in all or part of the cushion surface that can interfered with by side glass or obstacles inside or outside of the car body during deployment of the airbag. The location with a dynamic tearing characteristic P value of 1.5 or greater may be on one or both sides of the textile for a hollow weave airbag. When the deployment behavior of an airbag is unstable, the locations in which the value of the dynamic tearing characteristic P is 1.5 or greater are preferably increased. The locations in which the dynamic tearing characteristic P value is 1.5 or greater preferably constitute at least 50 cm$^2$, and more preferably at least 100 cm$^2$, in the surface area of the textile for a hollow weave airbag. The dynamic tearing characteristic P value may also be 1.5 or greater throughout the entire expanding section of the airbag.

The woven texture at the expanding portion of the double hollow weave pattern is extremely important for increasing the dynamic tearing characteristic P of the textile for a hollow weave airbag of the embodiment. The woven texture of the double hollow weave pattern must be a loose weave, which includes not only a 1/1 plain weave pattern but also another pattern such as a 2/2 lattice weave (or "mat weave" or "basket weave") pattern. A loose weave may be, for example, a 2/2 mat weave, 3/3 mat weave, 2/1 mat weave, twill weave or ripstop, and these may also be combined or interwoven with a plain weave texture. If the woven texture is a loose structure, the fibers forming the textile will be able to efficiently absorb energy by moving when dynamic perforation mode or tear mode is applied to the textile.

The ease of movement of fibers composing a textile when dynamic perforation mode or tear mode has been applied to the textile depends on the looseness of the woven texture. In other words, it depends on the fineness of the fibers forming the textile, the density of the textile and the frequency of up and down weaves of the fibers in the woven structure.

Unlike a plain weave texture where the warp yarn and weft yarn are alternately woven up and down, other woven textures may have locations where two (or more) adjacent fibers simultaneously appear on the front or back side. It may be assumed that the actual cover factor is reduced at such locations. In a 2/2 mat weave, for example, two adjacent fibers do not cover as a single yarn, but rather the two are separately covering. When the actual cover factor is calculated with the assumption that two fibers are covering as a single thread, the density of the textile is ½ the value while the fineness of the yarn forming the textile is double the value. Therefore, the actual cover factor is reduced by 1/√2 compared to a cover factor where every two fibers are considered to be covering as single yarns. That is, the looseness of the woven texture can be assumed to depend on the degree of reduction in the actual cover factor with respect to the cover factor.

The value of the actual cover factor can be expressed as the effective cover factor CF'. The effective cover factor CF' is calculated by the following formula:

$$CF'=Cx \times \sqrt{\{Fx \times (Dx/Cx)\}} + Cy \times \sqrt{\{Fy \times (Dy/Cy)\}}$$

{where Cx is the number of warp fiber intersections per 2.54 cm, Fx is the fineness (dtex) of the warp yarn forming the double hollow weave pattern, Dx is the number of warp threads per 2.54 cm (warp density), Cy is the number of weft fiber intersections per 2.54 cm, Fy is the fineness (dtex) of the weft yarn forming the double hollow weave pattern, and Dy is the number of weft threads per 2.54 cm (weft density)}.

A fiber intersection is a location where fibers forming the textile move from the front side to the back side or from the back side to the front side, and Cx and Cy represent the up and down frequency of the fibers in the woven structure of weft yarn and warp yarn. In a plain weave, the up and down pattern is repeated for each fiber forming the textile, and Cx and Cy are equal to Dx and Dy, respectively. In a 2/2 mat weave, Cx/Dx and Cy/Dy are both 0.5.

At least a partial region of the double hollow weave pattern of the textile for a hollow weave airbag of the embodiment has an effective cover factor CF' value of preferably 2200 or lower, more preferably 1400 to 2200 and even more preferably 1500 to 2000. A CF' value of 1400 or greater can increase the internal pressure retention during airbag deployment. Since adhesion between a coating agent and a covered article is improved with a certain degree of intertwining points, this can help prevent reduction in abrasion resistance even under harsh environmental test conditions such as heat aging, moist heat aging and thermal cyclic aging. An effective cover factor CF' value of 2200 or lower, on the other hand, can increase the degree of freedom of the fibers forming the textile, helping to increase the dynamic tearing characteristic P value and improve the packability.

At least a partial region of the double hollow weave pattern of the textile for a hollow weave airbag of the embodiment has a ratio CF'/CF of preferably 0.95 or lower for the cover factor CF and effective cover factor CF'. The ratio is more preferably 0.90 or lower and even more preferably 0.85 or lower. If the cover factor ratio CF'/CF is reduced to 0.95 or lower it will be possible to increase the value of the dynamic tearing characteristic P. The cover factor ratio CF'/CF is preferably 0.65 or higher, more preferably 0.70 or higher and even more preferably 0.75 or higher. A cover factor ratio CF'/CF of 0.65 or higher can increase the internal pressure retention during airbag deployment, the abrasion resistance after aging treatment, and the dynamic tearing characteristic.

The textile for a hollow weave airbag of the embodiment preferably has in at least a partial region of the double hollow weave pattern a section wherein the value of the dynamic tearing characteristic Px and Py for warp and weft are both 0.7 or greater. If Px and Py are both 0.7 or greater it will be possible to provide resistance against laceration in both directions. Px and Py are both preferably 0.8 or greater, more preferably 0.9 or greater and even more preferably 1.0 or greater. The upper limits for the Px and Py values are not particularly restricted, but they are preferably 20 or lower in order to obtain a flexible airbag base fabric.

At least a partial region of the double hollow weave pattern of the textile for a hollow weave airbag of the embodiment preferably has a location wherein the warp/weft ratio for the effective cover factor CF', represented by the following formula:

$$[Cx \times \sqrt{\{Fx \times (Dx/Cx)\}}]/[Cy \times \sqrt{\{Fy \times (Dy/Cy)\}}]$$

is 0.7 to 1.2.

In order to obtain a warp/weft ratio of 0.7 to 1.2 for the effective cover factor CF', the woven texture may be designed so that the woven density varies for warp and weft and so that the value of Cy is either lower or higher with respect to Cx. If the warp/weft ratio for the effective cover factor CF' is 0.7 to 1.2 it will be possible to increase Px and Py in a satisfactory balance. If the warp/weft ratio for the effective cover factor CF' is 0.7 or greater it will be possible to increase the flexural modulus warp/weft ratio, as explained below.

At least a partial region of the double hollow weave pattern of the textile for a hollow weave airbag of the embodiment has a flexural modulus in the warp and/or weft direction of preferably 0.5 gf·cm$^2$/cm or lower, more preferably 0.4 gf·cm$^2$/cm or lower and even more preferably 0.3 gf·cm$^2$/cm or lower, as determined using a KES bending tester. The packability of the airbag can be improved if the flexural modulus of the textile is a small value of 0.5 gf·cm$^2$/cm or lower. The lower limit for the flexural modulus of the textile is not particularly restricted but is preferably 0.01 gf·cm$^2$/cm or greater in order to obtain strength suitable for an airbag.

In a hollow weave textile for a curtain airbag, the warp direction of the textile is considered as the longitudinal direction of the cushion from the viewpoint of nesting efficiency, and therefore the cushion is either rolled up or folded in a cornice fashion parallel to the warp direction for storage. Since bending deformation is therefore applied to the weft yarn forming the textile, the flexural modulus in the weft direction of the textile is most preferably limited to 0.5 gf·cm$^2$/cm or lower. A low flexural modulus in the weft direction of the textile will help reduce the roll storage diameter.

At least a partial region of the double hollow weave pattern of the textile for a hollow weave airbag of the embodiment has a flexural modulus warp/weft ratio of preferably 2.0 or greater, more preferably 3.0 or greater and even more preferably 4.0 or greater, as determined using a KES bending tester. A flexural modulus warp/weft ratio of 2.0 or greater can help improve the packability of the airbag. The upper limit for the flexural modulus warp/weft ratio is not particularly restricted but is preferably 10 or lower in order to obtain strength suitable for an airbag.

Since the textile for a hollow weave airbag of the embodiment has a loose weave in at least a partial region of the double hollow weave pattern, the abrasion resistance of the resin-adhered surface tends to be lower than a common plain weave texture. Particularly during environment testing such as heat aging, moist heat aging and thermal cyclic aging, the fibers forming the textile tend to move by contraction caused by heat or moisture, leading to more destruction of the adhesive after aging treatment, and inability to maintain deployment pressure of the bag after exposure to a moist heat environment. The abrasion resistance is therefore lowered after environment testing. A looser weave in the woven texture increases the degree of freedom of fibers forming the textile, and therefore the dynamic tearing characteristic P and the post-aging treatment abrasion resistance are in a trade-off relationship.

As a result of much ardent research, the present inventors have found that if a loose weave is used in at least a partial region of the double hollow weave pattern and the difference between the warp yarn crimp percentage and weft yarn crimp percentage in that weave is 4.0% or greater, it is possible to satisfactorily obtain both the required dynamic tearing characteristic P and post-aging treatment abrasion resistance. With a large difference between the warp yarn crimp percentage and weft yarn crimp percentage, the yarns in one direction will have a relatively linear structure while the yarns in the other direction will have a relatively wavy structure. This is thought to be because the difference between irregularities is larger on the front side of the textile, and an increased anchor effect is produced between the fibers forming the textile and the surface resin even if the surface resin is adhering with a uniform thickness. The crimp percentage may be higher for the warp yarn or for the weft yarn, but the weft yarn crimp percentage is preferably higher from the viewpoint of lowering bending resistance in the weft direction. The crimp percentage difference is preferably 5.0% or greater, more preferably 6.0% or greater and even more preferably 8.0% or greater. The upper limit for the crimp percentage difference is not particularly restricted but is preferably 20% or lower.

A larger crimp percentage difference can be obtained if the crimp percentage of the yarn is lowered in one direction by adjusting the weaving tension or the post-treatment tension. By lowering the crimp percentage in one direction it is possible to relatively increase the crimp percentage in the other direction, thereby increasing the crimp percentage difference. When the pattern forming the textile is a plain weave alone, however, there is a limit to the crimp percentage difference that can be obtained. This is because an airbag textile has a high density structure, and the degree of freedom of the fibers forming the textile is lower in a plain weave texture wherein the warp yarn and weft yarn are alternately up and down. In a structure with a loose weave, however, the actual cover factor is lower than in a plain weave texture, and consequently the fibers forming the textile have a greater degree of freedom and the crimp percentage difference can be increased. Although the post-aging treatment abrasion resistance of a textile is generally lower if the degree of freedom of the fibers forming the textile is increased, a design in which ease of fiber movement is used to increase the crimp percentage difference can inhibit reduction in the post-aging treatment abrasion resistance of the textile.

The hot water dimensional change rate of the raw yarn used in the textile for a hollow weave airbag of the embodiment is preferably 5% to 10%. A hot water dimensional change rate of 5% or greater for the raw yarn will allow crimping to be added by heating during post-treatment, and can increase the crimp percentage difference. A hot water dimensional change rate of 10% or lower for the raw yarn, on the other hand, can improve the post-treatment dimensional stability of the textile. The hot water dimensional change rate of the raw yarn is more preferably 6% or greater and even more preferably 7% or greater.

The warp yarn used in the textile for a hollow weave airbag of the embodiment preferably has intertwining in a range of 5/m to 50/m by interlacing. Intertwining of 5/m or greater can inhibit generation of fluff during weaving. Intertwining of 50/m or lower can result in separation of the yarns at locations where two (or more) adjacent fibers simultaneously appear on the front side or back side of the loose weave, aiding integration between the fibers and allowing the air permeability of the base fabric to be improved.

Twisting at 300 T/m or lower and preferably 100 T/m or lower may also be added to the warp yarn. In addition, the yarns can be provided with smoothness and convergence by simple oiling or waxing during warping, and they may also be glued with a sizing agent with a formulation based on an acryl resin, acrylic resin with PVA, polyacrylic acid or silicone, in which case the amount of glue is preferably 0.5% to 3%.

The same yarn may also be used for the weft yarn as for the warp yarn, and the intertwining is preferably 5/m or greater and 50/m or lower. If the intertwining is 50/m or lower, the textile can be formed with a low degree of air permeability, helping to facilitate and speed up lifting onto air when the weft yarn is pressed during use of an air jet loom or the like.

A loom such as an air jet loom, rapier loom, projectile room or multi phase weaving machine may be used for production of the textile for a hollow weave airbag of the embodiment, with no limitation to these. A full temple is preferably used during weaving from the viewpoint of stabilization of the woven cloth. Movement of the fabric may also be further inhibited by adding irregularities or grooves to the temple bars of a full temple, in order to stabilize the woven cloth. Added threads may be used at both ends of the textile to compensate for fabric sagging. The machine used to control up and down of the warp yarn may be a jacquard or dobby machine, but an electronic jacquard machine is preferred for advantages in terms of productivity and rapid design switching. The number of jacquard holes is not particularly restricted, but an electronic jacquard with a large number of 2000 or 14,000 holes is preferred since it can be precisely adapted to complex designs.

The warp yarn tension during weaving of the textile for a hollow weave airbag of the embodiment is preferably 0.18 cN/dtex to 0.50 cN/dtex, more preferably 0.20 cN/dtex to 0.45 cN/dtex and even more preferably 0.22 cN/dtex to 0.40 cN/dtex. A warp yarn tension of 0.18 cN/dtex or greater can stabilize the woven texture and improve the post-aging treatment abrasion resistance on resin-adhered surfaces. A woven greige usually has a high crimp percentage in the warp direction and a low crimp percentage in the weft direction. The textile for a hollow weave airbag of the embodiment preferably has a higher weft yarn crimp percentage than the warp yarn crimp percentage from the viewpoint of lowering the bending resistance in the weft direction, but the warp yarn tension is preferably higher since this allows the warp yarn crimp percentage to be made lower than usual and the weft yarn crimp percentage to be made higher than usual, at the greige stage. If the warp yarn tension is 0.50 cN/dtex or lower it will be possible to reduce warp fluff generation due to friction with the reed or harness.

The wind-up tension during weaving of the textile for a hollow weave airbag of the embodiment is preferably 0.4 to 2.0 times, more preferably 0.6 to 1.8 times, even more preferably 0.8 to 1.6 times and yet more preferably 1.0 to 1.6 times the warp yarn tension. In a structure with a loose weave the degree of freedom of the fibers forming the textile is high and the wind-up tension can therefore be at least 0.4 times the warp yarn tension during weaving, thereby resulting in a looser woven structure after weaving and helping to prevent change in the warp and weft crimp percentages. If the wind-up tension during weaving is no greater than 2.0 times the warp yarn tension, on the other hand, the woven texture can be stabilized and the post-aging treatment abrasion resistance on resin-adhered surfaces can be improved.

The oil extraction with cyclohexane (oil adhesion percentage) of the textile for a hollow weave airbag of the embodiment is preferably 0.01 wt % to 2.0 wt %, more preferably 0.05 wt % to 1.5 wt %, even more preferably 0.1 wt % to 1.0 wt % and yet more preferably 0.2 wt % to 0.5 wt % with respect to the weight of the textile. If the oil by cyclohexane extraction is 0.01 wt % or greater, the smoothness of the fiber surface will be improved and the fibers forming the textile will move more easily, allowing the dynamic tearing characteristic P value to be increased. It is therefore possible to prevent reduction in the internal pressure retention of the cushion by laceration. If the oil by cyclohexane extraction is 2.0 wt % or lower, on the other hand, it will be possible to increase the adhesion of the resin and maintain air-flow resistance even after a load has been applied to the textile.

An extracted oil percentage of 0.01 wt % to 2.0 wt % can be obtained by selecting the spinning oil from the raw yarn production step or the warping oil in the warping step, as well as by avoiding excessive deoiling in the scouring step after weaving. In production steps for airbag textiles with double hollow weave patterns it is common to use a scouring agent for scouring of the oil or sizing agent applied during the raw yarn production or warping step, in order to increase the resin adhesion. With the textile for a hollow weave airbag of the embodiment it is possible to employ a method in which the scouring agent is diluted to a greater degree than the prior art, or is not used at all, in a scouring step carried out to increase the oil adhesion percentage.

A resin may be used to cover the textile for a hollow weave airbag of the embodiment in order to maintain internal pressure during airbag deployment. The resin coverage is preferably 5 g/m$^2$ to 120 g/m$^2$. A coverage of 5 g/m$^2$ or greater will inhibit the textile air permeability as the coating amount increases, resulting in satisfactory internal pressure retention. A coating amount of 120 g/m$^2$ or lower will result in a lighter airbag with a lower coating amount, thus contributing to shorter deployment time (earlier deployment). The resin coverage is more preferably 20 g/m$^2$ to 100 g/m$^2$ and even more preferably 30 g/m$^2$ to 80 g/m$^2$.

The resin applied to the textile serves to render the textile surface non-permeable, and it is preferably applied by coating from the viewpoint of working processability. The coating agent used may be silicone, polyurethane, polyamide, or the like. Silicone is most preferred, which is soft without cracking and peeling of the coating even under cold conditions while being relatively resistant to combustion, and can contribute to flame retardance of the textile. For silicone, a resin composition that undergoes thermal crosslinking by addition reaction is preferred, and there may be used a composition of a terminal alkenyl polyorganosiloxane with hydrogensilicone as the crosslinking agent, and addition of an addition reaction catalyst.

The method of coating a silicone resin is preferably one using a floating knife, a rolling knife or dipping, but without any particular restrictions. After coating the silicone composition, heat setting is subsequently carried out at 120° C. to 200° C. for 10 seconds to 600 seconds, and curing is also preferably carried out by silicone crosslinking reaction.

Tension is preferably applied in the warp direction during coating of the resin. By applying tension in the warp direction it is possible to lower the crimp percentage in the warp direction, producing a uniform film thickness for the resin on the flat surface. The tension during coating will depend on the woven texture but is preferably 0.20 cN/dtex to 0.72 cN/dtex, more preferably 0.25 cN/dtex to 0.64 cN/dtex and even more preferably 0.30 cN/dtex to 0.56 cN/dtex. By limiting the tension during coating to 0.72 cN/dtex or lower it is possible to reduce dimensional change after processing. Since an airbag textile with a double hollow weave pattern has extremely high density, there is a limit to the warp/weft crimp percentage difference in a woven structure consisting of a plain weave texture alone. If the woven structure includes a loose structure, however, movement between fibers will be easier and the crimp percentage difference can be increased. Increasing the crimp percentage difference can inhibit reduction in the post-aging treatment abrasion resistance of the textile.

After coating, tension is preferably applied in the warp direction during the heat treatment step that includes vulcanizing and heat setting. The tension during the heat treatment step will depend on the woven texture but is preferably 0.20 cN/dtex to 0.72 cN/dtex, more preferably 0.25 cN/dtex to 0.64 cN/dtex and even more preferably 0.30 cN/dtex to 0.56 cN/dtex. If tension of 0.20 cN/dtex or greater is applied in the warp direction during the heat treatment step it will be possible to lower the crimp percentage in the warp direction and increase the crimp percentage difference between warp and weft. If the tension is limited to no greater than 0.72 cN/dtex, on the other hand, it will be possible to reduce dimensional change after processing. By reducing tension in the weft direction it is possible to increase the crimp percentage in the weft direction.

A pin tenter or roll-to-roll may be used to control the tension during heat setting, allowing heat setting to be carried out in a heating tank. Heat setting with a roll-to-roll is preferred to aid in applying tension in the warp direction and to avoid tension in the weft direction. When a pin tenter is used, width may be inserted during pinning to increase the crimp percentage in the weft direction.

Since a loose weave structure has a high degree of freedom of the fibers forming the textile, it allows the crimp percentage to be changed more easily, but if the tension is loosened during processing it will be easier to reduce the difference in crimp percentage between warp and weft. If a constant tension is maintained without relaxing from the weaving step until the step of heat setting by heat treatment, it will be possible to prevent reduction in the difference in crimp percentage between warp and weft.

As an alternative to coating of the resin, a resin film or tape may be attached by thermal lamination to inhibit air permeation through the textile surface. The thickness for such a film is preferably 5 μm to 50 μm.

EXAMPLES

The invention will now be explained in detail by Examples and Comparative Examples, with the understanding that these Examples are not limitative on the invention. The measurement and evaluation methods used throughout are the following.

(1) Raw Yarn Strength and Hot Water Dimensional Change Rate

Measurement was carried out according to the method described in JIS L 1013:2010.

(2) Bag Weight (Basis Weight) and Density

The bag weight (basis weight) was measured according to Method B (ISO method), "Determination of mass per unit area under standard conditions" according to JIS L 1096: 2010, using five 100 mm×100 mm samples. The bag weight (basis weight) was the measured weight for one double hollow weave portion, including resins such as coatings. When the test strip had insufficient dimensions, a sample was taken with the widest possible area.

The density was determined by taking five 2.54 cm$^2$ samples, counting the number of yarns of each sample using an optical microscope at 10× magnification, and calculating the average. When the woven texture differed in the same textile, five samples with the same woven texture were used to obtain the average. When the test strip had insufficient dimensions, a sample was taken with the widest possible area.

(3) Resin Amount

Coating amount: The resin amount used was the textile weight increment per unit area in the resin coating step. The resin amount can also be determined by analysis of the textile in the following manner. A 10 cm-square test piece is precisely sampled from the textile and notched to less than about 5 mm square, cyclohexane is used for twice-repeated rinsing at 25° C. for 5 minutes, and after air-drying, it is dried at 105° C. for 12 hours with a hot air drier. The synthetic fiber is dissolved in a solvent. When the fiber forming the textile is polyamide fiber and the resin is a crosslinked silicone film, for example, the fiber is dissolved overnight at ordinary temperature using 250 ml of 90% formic acid, and the undissolved resin film is filtered out. The filtered out resin film is thoroughly rinsed with a solvent and then rinsed with water, and subsequently subjected to hot air drying at 105° C., the absolute dry mass w (g) is measured, and the resin amount (g/m²) is calculated.

(4) Fineness and Crimp Percentage

The fineness and crimp percentage were measured according to the Method for determining apparent fineness of yarn removed from fabric (Method A) and Method for determining yarn weave contraction (Method B), of JIS L 1096:2010. However, the load during measurement of the straight pulled yarn length was 9.3 mN/tex, and the average measurement for 20 continuous warp yarns and weft yarns was calculated.

(5) Oil Adhesion Percentage

Approximately 20 g of textile was sampled and allowed to stand for 3 hours in a hot air drier at 105° C., after which the mass was measured with an electronic scale. The oil portion of the textile was subjected to solvent extraction for 8 hours with approximately 500 ml of cyclohexane, using a Soxhlet extractor, and after filtration, the solvent was distilled off and the oil recovered. The recovered oil was dried for 3 hours in a vacuum dryer at 5 mmHg, 25° C. It was then transferred to a desiccator and allowed to cool for 15 minutes, after which the weight of the recovered oil was measured. This was treated several times, and the amount of recovered oil in approximately 100 g portion of the textile sample was measured. The oil adhesion rate was calculated, from the recovered oil amount with respect to the dry weight of the textile.

(6) Dynamic Tearing Lengths Tx, Ty

Measurement was conducted according to the "Test method for the determination of resistance to puncture and dynamic tearing of materials" of JIS T 8050:2005. A blade-holding block and blade with a mass of 1000 g were used, and adjustment was made so that the block and blade kinetic energy was 6.6 to 7.0 J as calculated from the average speed when the block was consecutively dropped 5 times, the value at that time being recorded as the kinetic energy E (J). The expanding part of the double hollow weave pattern was cut with scissors so as to be the center of the test strip (the blade puncture and tear site), and the test piece was fixed to the mounting block with the resin-coated surface on the outer side. The test was conducted with a minimum of 3 test pieces each in the warp direction and the weft direction, and the average tear length in each direction was calculated as Tx, Ty.

(7) KES Bending Resistance

A KES-FB-2 Pure Bending Tester by Kato Tech Corp. was used for the measurement. Three test strips of approximately 50 mm-wide, 100 mm-long dimensions for both warp and weft were cut out from the textile. The maximum curvature was 2.5/cm, the SENS value was set to 50 g and the measurement was conducted for one cycle. Three measurements were made each for warp and weft, and the average value B-MEAN (gf·cm²/cm) was recorded as the KES bending resistance. The KES bending resistance for the warp yarn was the KES bending resistance while deformation was applied to the warp yarn.

(8) Abrasion Resistance after Moist Heat Aging

A test strip was taken from the moist heat aged textile by the following method, and measured according to the "Rubbing test for rubber- and plastic-coated fabrics" of JIS K 6404-6:1999.

First, the textile was exposed to an environment of 95% RH, 85° C. for 240 hours for aging treatment. Six test strips with dimensions of approximately 25 mm width and 100 mm length were taken from the aging treated textile in the warp direction, with the expanded section of each double hollow weave pattern at the center. A Scott Type Folding and Abrasion Tester-2 by Toyo Seiki Seisakusho, Ltd. was used for the evaluation. Two of the sampled test strips were overlaid with the resin-coated surfaces on the inner side, sandwiching the two test strips with the gripping tool of the tester at a grip spacing of 30 mm. Rubbing was carried out 50 times using a 2 kgf pressing force, a rubbing speed of 120 passes per minute and a chuck moving distance of 50 mm, and the presence or absence of detachment between the surface resin and fabric was examined. When no detachment was observed, the rubbing procedure and confirmation of detachment were repeated another 50 times each, and the cumulative number of rubs at the point of detachment was recorded. The results were obtained for 3 measurements, and the average was recorded as the abrasion resistance after moist heat aging.

(9) Roll Diameter

A textile for a hollow weave airbag having the shape shown in FIG. 1 was wound onto a roll in the vertical direction and fixed with tape. The circumference of the roll was measured at 5 locations using a tape measure, and the average was divided by n to calculate the roll diameter. The assigned evaluation was G when the roll diameter was less than 30 mm, F when it was 30 mm or greater and less than 35 mm, and P when it was 35 mm or greater.

(10) Laceration Resistance

A textile for a hollow weave airbag having the shape shown in FIG. 1 was wound onto a roll in the vertical direction and fixed with tape. A 2.0 mol hybrid inflator was mounted on the gas supply unit to create a curtain airbag module. The module was used for an impactor test. Specifically, the airbag module was deployed while being impacted with an object known as an impactor head under the following conditions to simulate collision behavior in an actual vehicle.

Figure 2:
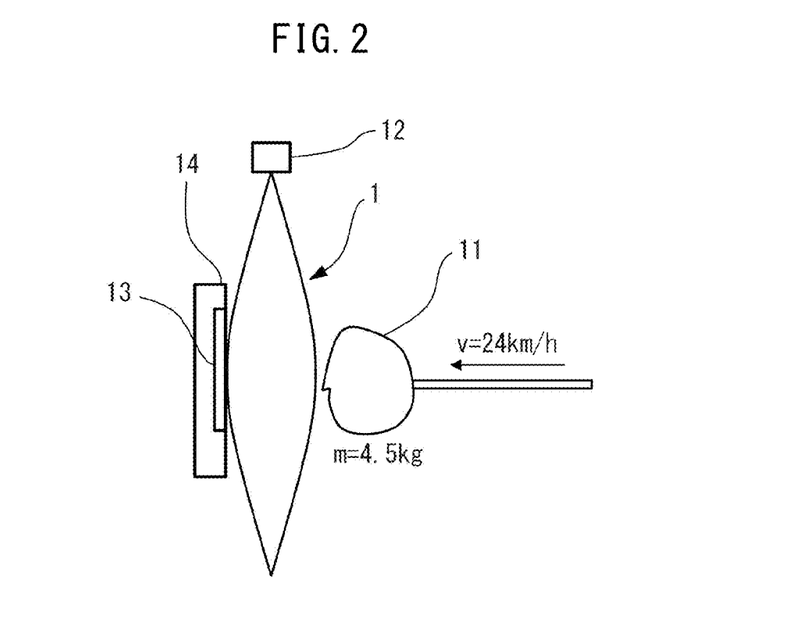
FIG. 2 is a schematic view of an impactor test for an Example.

The impactor head used had a weight of 4.5 kg and a head speed of 24 km/hr. The impact timing was 30 milliseconds after inflator activation, and the impact point was the point at the "+" sign in FIG. 1 during airbag deployment (5: protective area center section). A board was set on the opposite side of the module location from the impactor head along the line of deployment of the airbag, while a checkering file (flat type, coarseness: 10 cuts/cm², 250 mm length×25 mm width×6 mm thickness) by Tsubosan Co. was mounted at the impact point section in the vertical direction (FIG. 2) as a jig to simulate glass fragments. The file was positioned so that the center of the file was at the impact point, and anchored so that the face of the file (valleys) and board surface were on the same plane. The internal pressure during deployment was measured at the location of the "x" symbol in FIG. 1 during airbag deployment. An impactor test was carried out by a common procedure and the lengths of lacerations in the textile after the test were evaluated as VG for less than 5 mm, G for 5 to 10 mm, F for 10 mm to 20 mm and P for 20 mm or greater.

(11) Internal Pressure Retention after Moist Heat Aging

The internal pressure retention after moist heat aging was evaluated by the following method.

First, a textile for a hollow weave airbag having the shape shown in FIG. 1 was wound onto a roll in the vertical direction and fixed with tape. A 2.0 mol hybrid inflator was mounted on the gas supply unit to create a curtain airbag module. The obtained module was exposed to an environment of 95% RH, 85° C. for 240 hours for aging treatment. The aged module was used for a static deployment test.

The internal pressure during deployment was measured at the location of the "+" symbol in FIG. 1 during airbag deployment. The assigned evaluation was G if the internal pressure of the cushion at elapse of 6000 milliseconds after deployment was at least 30% of the maximum internal pressure of the cushion after deployment, F if it was at least 10% and less than 30%, and P if it was less than 10%.

Example 1

Figure 3:
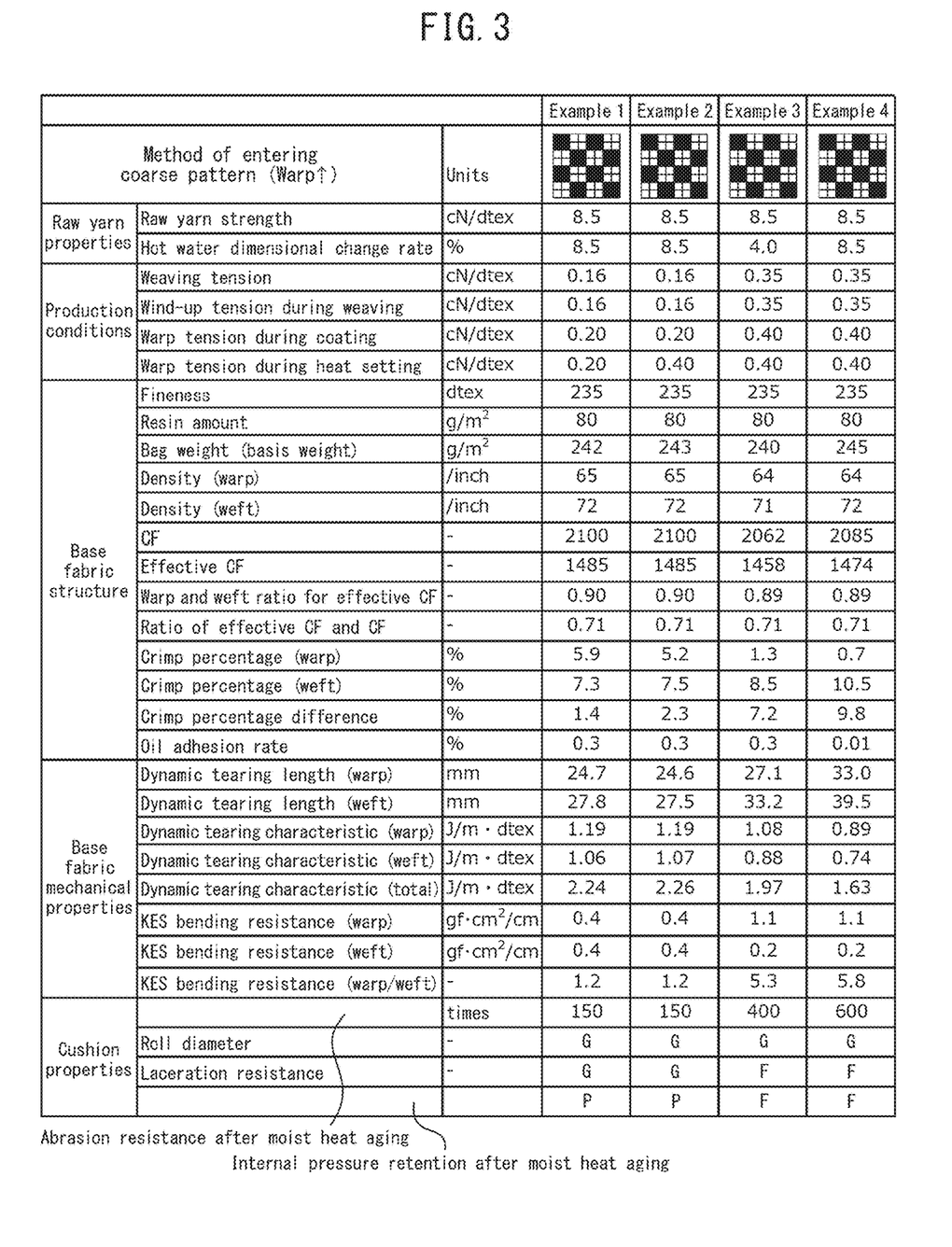
FIG. 3 is a table summarizing the production conditions, structures and mechanical properties of the hollow weave airbag textiles of Examples 1 to 4.

A 24 L-volume side curtain airbag having the shape shown in FIG. 1 was woven using nylon 66 fibers with a raw yarn strength of 8.5 cN/dtex and a hot water dimensional change rate of 8.5% as the warp yarn and weft yarn, and an electronic jacquard apparatus and rapier loom. The woven texture at the joints closing the bag varied in the order: hollow weave 2/2 oblique (8 yarns) hollow weave (including 4 matelasse) 3/3 oblique (6) hollow weave. The woven texture at the double weave portion was as shown in FIG. 3, wherein the portions without expansion on the outer side of the joints of the bag had the double weave of the hollow weave about 1% partially joined. A greige was produced with a warp yarn tension during weaving of 0.16 cN/dtex and a wind-up tension of 0.16 cN/dtex, and scouring and heat setting were carried out in a hot water bath at 70° C.

One side of the obtained fabric was coated with a liquid silicone composition to 80 g/m² using a roll-on knife coater, at a coating tension of 0.20 cN/dtex in the warp direction, and was then heat set at 180° C. for 1 minute with in-dryer tension of 0.20 cN/dtex in the warp direction. The other side was likewise coated with a liquid silicone composition to 80 g/m², and heat set in a dryer at 180° C. for 1 minute. The total fineness of the textile was 235 dtex and the oil adhesion percentage was 0.3 wt %.

The obtained textile for a hollow weave airbag was used to produce a curtain airbag. The curtain airbag had an inner tube inserted as indicated by 4 in FIG. 1, which guided the deployment gas from a gas supply port at the rear edge to the front expanding section and rear expanding section. The inner tube was formed of a 25 g/m² silicone-coated fabric having a 41×41/2.54 cm (warp and weft) plain weave made using 700 dtex/105f polyamide 6·6 fiber. The fabric was bias sewn into a tubular shape with an aperture allowing insertion of the gas supply port. The sewing was a single row lock stitch with 1400 dtex sewing thread, and with a stitch number of 45/10 cm. The tip of the inner tube was open, and with the sewn section facing upward, a downward facing notch was formed in the rear expanding section for gas supply. The properties of the obtained curtain airbag are shown in FIG. 3, indicating low internal pressure retention after moist heat aging, but excellent packability and fairly satisfactory laceration resistance during deployment.

Example 2

A greige was made in the same manner as Example 1 and was subsequently scoured, and then heat set in the same manner as Example 1 except for using a warp yarn tension of 0.40 cN/dtex during heat setting. The total fineness of the textile was 235 dtex and the oil adhesion percentage was 0.3 wt %.

The rest of the procedure was carried out in the same manner as Example 1 to produce a curtain airbag. The properties of the obtained curtain airbag are shown in FIG. 3, indicating low internal pressure retention after moist heat aging, but excellent packability and fairly satisfactory laceration resistance during deployment.

Example 3

A greige was made in the same manner as Example 1, except for using nylon 66 fiber with a hot water dimensional change rate of 4.0% for the warp yarn and weft yarn, a warp yarn tension of 0.35 cN/dtex during weaving and a wind-up tension of 0.35 cN/dtex, and after subsequent scouring, it was heat set in the same manner as Example 1 except for using a tension of 0.40 cN/dtex in the warp direction during coating and a warp yarn tension of 0.40 cN/dtex during heat setting. The total fineness of the textile was 235 dtex and the oil adhesion percentage was 0.3 wt %.

A curtain airbag was then produced in the same manner as Example 1. The properties of the obtained curtain airbag are shown in FIG. 3, indicating fairly satisfactory internal pressure retention after moist heat aging, and excellent packability and fairly satisfactory laceration resistance during deployment.

Example 4

A greige was made in the same manner as Example 1, except for using a warp yarn tension of 0.35 cN/dtex during weaving and a wind-up tension of 0.35 cN/dtex, and after subsequent scouring and heat setting in a scouring tank at 90° C. containing 1 g/L of sodium hydroxide, 1 g/L of a scouring penetrant and 0.5 g/L of a chelate dispersant, it was further heat set in the same manner as Example 1 except for using a tension of 0.40 cN/dtex in the warp direction during coating and a warp yarn tension of 0.40 cN/dtex during heat setting. The total fineness of the textile was 235 dtex and the oil adhesion percentage was 0.01%.

The rest of the procedure was carried out in the same manner as Example 1 to produce a curtain airbag. The properties of the obtained curtain airbag are shown in FIG. 3, indicating fairly satisfactory internal pressure retention after moist heat aging, and excellent packability and fairly satisfactory laceration resistance during deployment.

Example 5

A greige was made in the same manner as Example 1, except for using a warp yarn tension of 0.35 cN/dtex during weaving and a wind-up tension of 0.35 cN/dtex, and after subsequent scouring and heat setting in a hot water bath at 90° C., it was further heat set in the same manner as Example 1 except for using a tension of 0.40 cN/dtex in the warp direction during coating and a warp yarn tension of 0.40 cN/dtex during heat setting. The total fineness of the textile was 235 dtex and the oil adhesion percentage was 0.1%.

Figure 4:
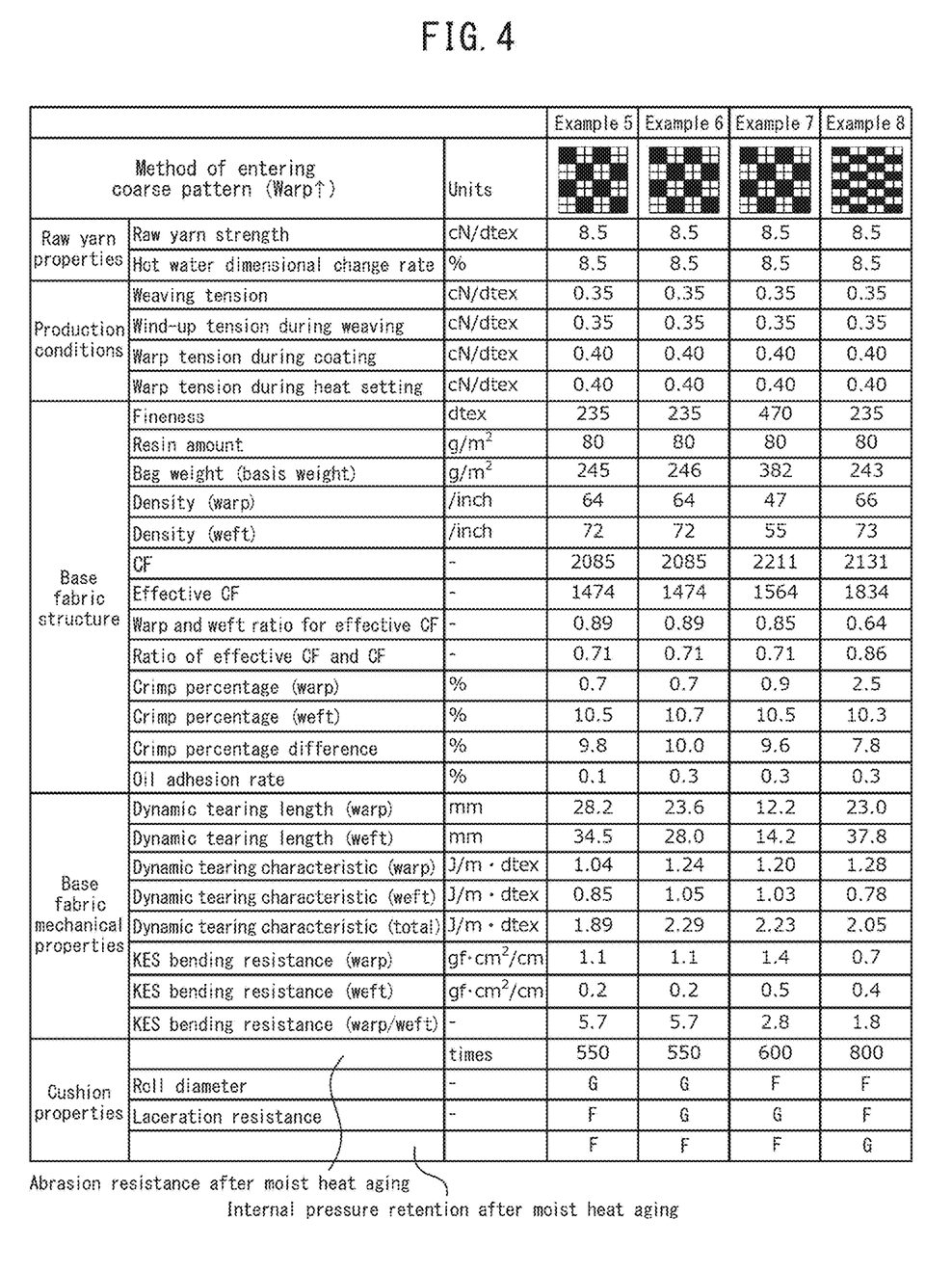
FIG. 4 is a table summarizing the production conditions, structures and mechanical properties of the hollow weave airbag textiles of Examples 5 to 8.

The rest of the procedure was carried out in the same manner as Example 1 to produce a curtain airbag. The properties of the obtained curtain airbag are shown in FIG. 4, indicating fairly satisfactory internal pressure retention after moist heat aging, and excellent packability and fairly satisfactory laceration resistance during deployment.

Example 6

A greige was made in the same manner as Example 1, except for using a warp yarn tension of 0.35 cN/dtex during weaving and a wind-up tension of 0.35 cN/dtex, and after subsequent scouring, it was heat set in the same manner as Example 1 except for using a tension of 0.40 cN/dtex in the warp direction during coating and a warp yarn tension of 0.40 cN/dtex during heat setting. The total fineness of the textile was 235 dtex and the oil adhesion percentage was 0.3%.

The rest of the procedure was carried out in the same manner as Example 1 to produce a curtain airbag. The properties of the obtained curtain airbag are shown in FIG. 4, indicating fairly satisfactory internal pressure retention after moist heat aging, and excellent packability and satisfactory laceration resistance during deployment.

Example 7

A curtain airbag was produced in the same manner as Example 6, except for using raw yarn with different fineness. The total fineness of the textile was 470 dtex and the oil adhesion percentage was 0.3%. The properties of the obtained curtain airbag are shown in FIG. 4, indicating fairly satisfactory internal pressure retention after moist heat aging, and fairly excellent packability and fairly satisfactory laceration resistance during deployment.

Example 8

A curtain airbag was produced in the same manner as Example 6, except that the woven texture of the double weave portion was changed as shown in FIG. 4. The properties of the obtained curtain airbag are shown in FIG. 4, indicating fairly satisfactory internal pressure retention after moist heat aging, and fairly excellent packability and fairly satisfactory laceration resistance during deployment.

Example 9

Figure 5:
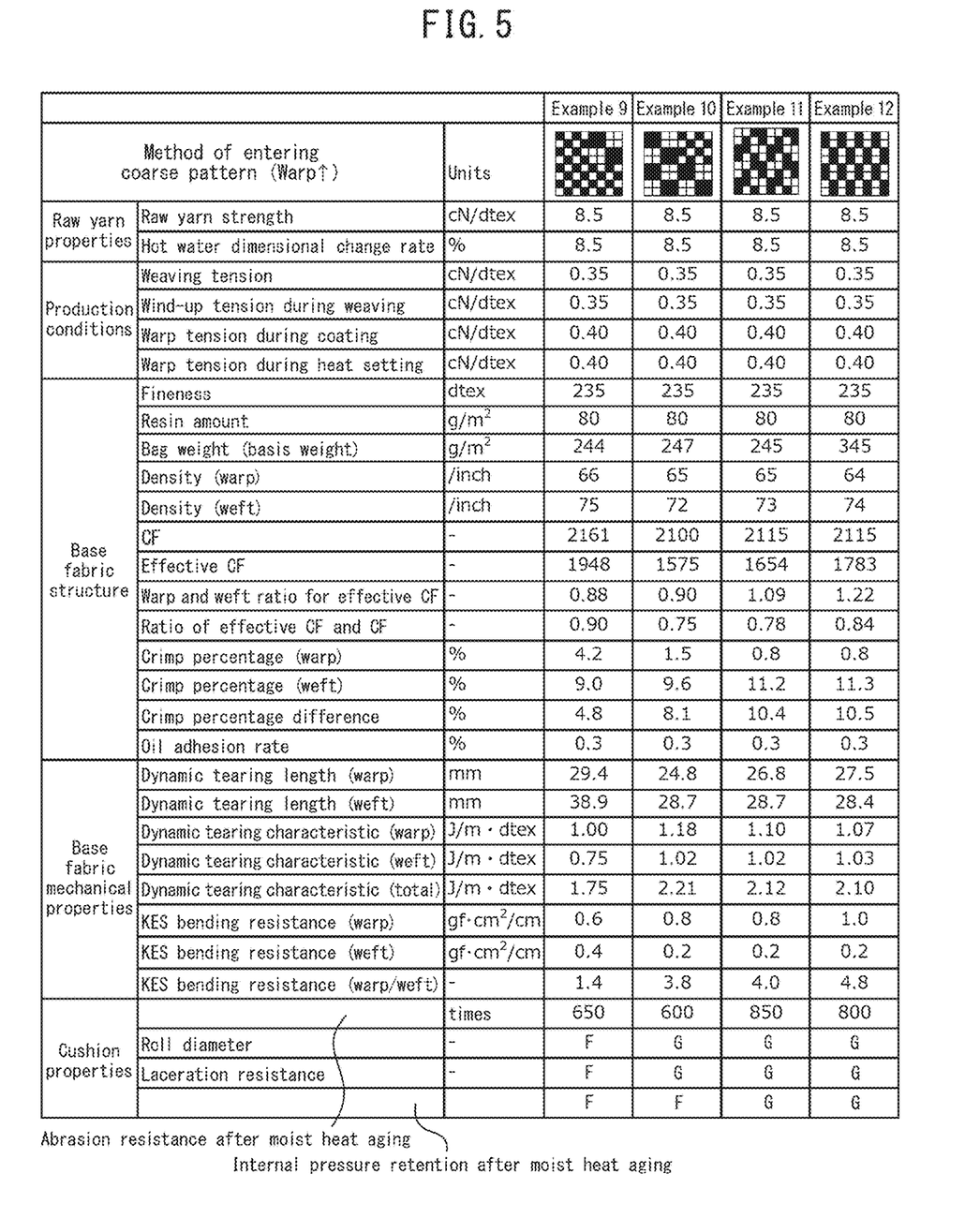
FIG. 5 is a table summarizing the production conditions, structures and mechanical properties of the hollow weave airbag textiles of Examples 9 to 12.

A curtain airbag was produced in the same manner as Example 6, except that the woven texture of the double weave portion was changed as shown in FIG. 5. The properties of the obtained curtain airbag are shown in FIG. 5, indicating fairly satisfactory internal pressure retention after moist heat aging, and fairly excellent packability and fairly satisfactory laceration resistance during deployment.

Example 10

A curtain airbag was produced in the same manner as Example 6, except that the woven texture of the double weave portion was changed as shown in FIG. 5. The properties of the obtained curtain airbag are shown in FIG. 5, indicating fairly satisfactory internal pressure retention after moist heat aging, and excellent packability and satisfactory laceration resistance during deployment.

Example 11

A curtain airbag was produced in the same manner as Example 6, except that the woven texture of the double weave portion was changed as shown in FIG. 5. The properties of the obtained curtain airbag are shown in FIG. 5, indicating satisfactory internal pressure retention after moist heat aging, and excellent packability and satisfactory laceration resistance during deployment.

Example 12

A curtain airbag was produced in the same manner as Example 6, except that the woven texture of the double weave portion was changed as shown in FIG. 5. The properties of the obtained curtain airbag are shown in FIG. 5, indicating satisfactory internal pressure retention after moist heat aging, and excellent packability and satisfactory laceration resistance during deployment.

Comparative Example 1

Figure 6:
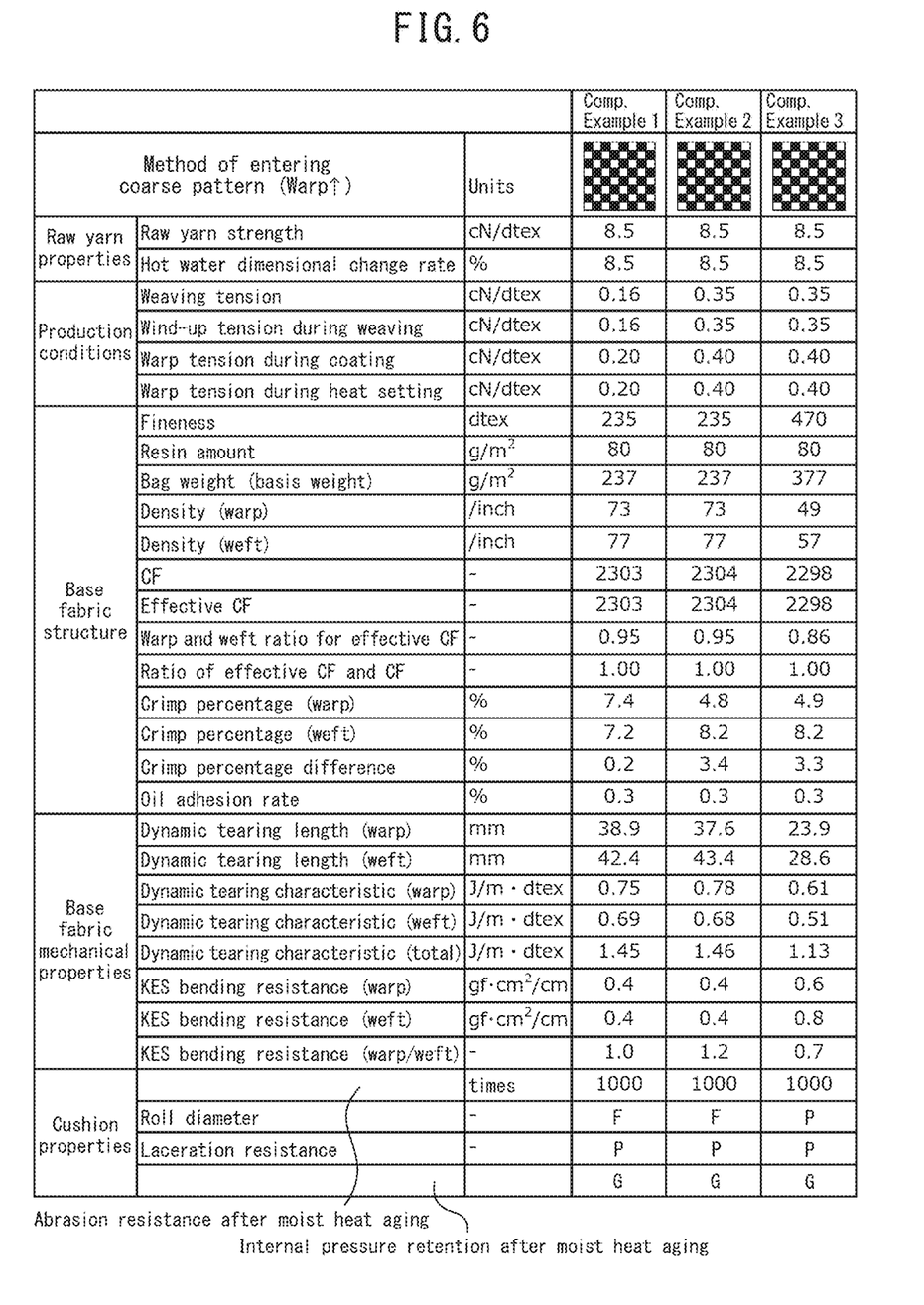
FIG. 6 is a table summarizing the production conditions, structures and mechanical properties of the hollow weave airbag textiles of Comparative Examples 1 to 3.

A curtain airbag was produced in the same manner as Example 1, except that the woven texture of the double weave portion was changed as shown in FIG. 6. The properties of the obtained curtain airbag are shown in FIG. 6, indicating satisfactory internal pressure retention after moist heat aging and fairly excellent packability, but low laceration resistance during deployment.

Comparative Example 2

A curtain airbag was produced in the same manner as Example 6, except that the woven texture of the double weave portion was changed as shown in FIG. 6. The properties of the obtained curtain airbag are shown in FIG. 6, indicating satisfactory internal pressure retention after moist heat aging and fairly excellent packability, but low laceration resistance during deployment.

Comparative Example 3

A curtain airbag was produced in the same manner as Example 7, except that the woven texture of the double weave portion was changed as shown in FIG. 6. The properties of the obtained curtain airbag are shown in FIG. 6, indicating satisfactory internal pressure retention after moist heat aging, but inferior packability and low laceration resistance during deployment.

INDUSTRIAL APPLICABILITY

By using a textile for a hollow weave airbag according to the invention it is possible to provide an airbag that satisfies the internal pressure retention and wear resistance required for a curtain airbag, while having excellent packability and excellent laceration resistance during airbag deployment. The textile for a hollow weave airbag of the invention is particularly suitable for use as a curtain airbag for protection of the human body from side walls.

REFERENCE SIGNS LIST

1 Side curtain airbag
2 Sewn section (bag boundary)
3 Inflator mounting unit
4 Inner tube
5 Opening
6 Joint
7 Center section of protection area
11 Impactor head
12 Side curtain airbag mounting unit
13 File
14 Board

The invention claimed is:
1. A textile for a hollow weave airbag having a double hollow weave pattern, wherein the value of the dynamic tearing characteristic P in at least a partial region of the double hollow weave pattern is 1.5 or greater, as represented by the following formulas:

$$Px = \{E/(Tx \times Fx)\} \times 1000$$

$$Py = \{E/(Ty \times Fy)\} \times 1000$$

$$P = Px + Py$$

where E is the kinetic energy (J) of the block and blade in a dynamic tearing test according to performance level 3 of JIS T 8050 Tx is the average value of the tearing length (mm) in the warp direction in a dynamic tearing test according to performance level 3 of JIS T 8050, Fx is the fineness (dtex) of the warp yarn forming the double hollow weave pattern, Ty is the average value of the tearing length (mm) in the weft direction in a dynamic tearing test according to performance level 3 of JIS T 8050, and Fy is fineness (dtex) of the weft yarn forming the double hollow weave pattern.

2. The textile for a hollow weave airbag according to claim 1, wherein the difference between the warp yarn crimp percentage and the weft yarn crimp percentage in the double hollow weave pattern is 4% or greater.

3. The textile for a hollow weave airbag according to claim 1, wherein the ratio CF'/CF of the cover factor CF and the effective cover factor CF' for at least a partial region of the double hollow weave pattern, represented by the following formulas:

$$CF = Dx \times \sqrt{Fx} + Dy \times \sqrt{Fy}$$

$$CF' = Cx \times \sqrt{\{Fx \times (Dx/Cx)\}} + Cy \times \sqrt{\{Fy \times (Dy/Cy)\}}$$

where Dx is warp density which is the number of warp threads per 2.54 cm, Fx is the fineness (dtex) of the warp yarn forming the double hollow weave pattern, Dy is weft density which is the number of weft threads per 2.54 cm, Fy is the fineness (dtex) of the weft yarn forming the double hollow weave pattern, Cx is the number of warp fiber intersections per 2.54 cm and Cy is the number of weft fiber intersections per 2.54 cm is 0.95 or lower.

4. The textile for a hollow weave airbag according to claim 3, wherein the value of the effective cover factor CF' for at least a partial region of the double hollow weave pattern is 2200 or lower.

5. The textile for a hollow weave airbag according to claim 1, wherein the dynamic tearing characteristic Px and Py for warp and weft in at least a partial region of the double hollow weave pattern is 0.7 or greater.

6. The textile for a hollow weave airbag according to claim 1, wherein the double hollow weave pattern is covered with a resin, the resin amount being 120 g/cm² or lower.

7. The textile for a hollow weave airbag according to claim 1, wherein an oil is adhered onto the constituent yarn of the double hollow weave pattern, the oil adhesion percentage being 0.01 wt % to 2.0 wt %.

8. The textile for a hollow weave airbag according to claim 1, wherein the fineness of the constituent yarn of the double hollow weave pattern is 500 dtex or lower.

9. The textile for a hollow weave airbag according to claim 1, wherein the basis weight of the double hollow weave pattern is 400 g/m² or lower.

10. The textile for a hollow weave airbag according to claim 1, wherein the flexural modulus warp/weft ratio in at least a partial region of the double hollow weave pattern is 2.0 or greater as determined with a KES bending tester.

11. The textile for a hollow weave airbag according to claim 1, wherein the flexural modulus in the warp and/or weft direction of at least a partial region of the double hollow weave pattern is 0.5 gf·cm²/cm or lower as determined with a KES bending tester.

12. The textile for a hollow weave airbag according to claim 3, wherein at least a partial region of the double hollow weave pattern has a warp/weft ratio for the effective cover factor CF', represented by the following formula:

$$[Cx \times \sqrt{\{Fx \times (Dx/Cx)\}}]/[Cy \times \sqrt{\{Fy \times (Dy/Cy)\}}]$$

is 0.7 or greater.

13. A method for producing a textile for a hollow weave airbag according to claim 1, wherein the warp yarn tension during weaving is 0.18 cN/dtex to 0.50 cN/dtex, the wind-up tension after weaving is 0.4 to 2.0 times the warp yarn tension, the tension in the warp direction during coating is 0.20 cN/dtex to 0.72 cN/dtex and the tension in the warp direction during heat setting is 0.20 cN/dtex to 0.72 cN/dtex.

14. The method according to claim 13, wherein the hot water dimensional change rate of the raw yarn used for weaving is 5% to 10%.

15. A curtain airbag that includes a textile for a hollow weave airbag according to claim 1.

\* \* \* \* \*